(12) United States Patent
McClennon et al.

(10) Patent No.: US 6,721,355 B1
(45) Date of Patent: Apr. 13, 2004

(54) METHOD AND APPARATUS FOR ADAPTIVE POWER MANAGEMENT IN A MODEM

(75) Inventors: Robert Scott McClennon, Ottawa (CA); Michael Wingrove, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/467,768

(22) Filed: Dec. 20, 1999

(51) Int. Cl.[7] .................................................. H04B 1/38
(52) U.S. Cl. ........................ 375/222; 375/260; 375/377
(58) Field of Search ................................ 375/222, 260, 375/261, 219, 377, 259; 370/464, 465

(56) References Cited

U.S. PATENT DOCUMENTS

| | | |
|---|---|---|
| 4,701,946 A | 10/1987 | Oliva et al. |
| 5,022,071 A | 6/1991 | Mozer et |
| 5,742,514 A | 4/1998 | Bonola |
| 5,987,338 A | 11/1999 | Gibbons et al. |
| 6,426,961 B1 * | 7/2002 | Nimmagadda ............... 370/493 |
| 6,498,808 B1 * | 12/2002 | Tzannes ...................... 375/225 |

\* cited by examiner

*Primary Examiner*—Young T. Tse
*Assistant Examiner*—David B. Lugo

(57) ABSTRACT

A data traffic predictor for a modem, and a method for power management in a modem, are described. The data traffic predictor includes a data traffic monitor, a periodicity detector and a power mode controller. The data traffic monitor monitors incoming data to the modem. If the periodicity detector determines if the data is substantially periodic, which indicates that the data traffic is isochronous, the power mode controller changes the modem power mode to quiescent power mode operating at a minimum data rate to permit the isochronous data traffic to be carried. The apparatus and method of the present invention permit low level control of a modem's power mode, and permit the use of a quiescent power mode running at a reduced data rate, without sacrificing quick recovery time to a full on power mode when required.

18 Claims, 7 Drawing Sheets

METHOD AND APPARATUS FOR ADAPTIVE POWER MANAGEMENT IN A MODEM

FIELD OF THE INVENTION

The present invention relates to adaptive power management in a modem. More particularly, the present invention relates to a method and apparatus for detecting and adapting to changing data rates in a telecommunications network using a modem. Such detection and adaptation can take advantage of reduced power modes in digital subscriber line communication networks, or other telecommunications schemes having reduced power modes.

BACKGROUND OF THE INVENTION

Much interest has been expressed recently in DMT modems to increase bandwidth with various communication schemes, especially those digital subscriber line schemes commonly referred to as xDSL systems, such as ADSL. For example, asymmetric digital subscriber line (ADSL) was conceived originally for video-on-demand type applications, but the focus is now on providing higher speed Internet services, such as the World Wide Web. The asymmetry in ADSL refers to the allocation of available bandwidth and means that it is faster (i.e.—has more allocated bandwidth) in the downstream (towards the subscriber) direction and slower in the upstream (towards a central office) direction. Some applications, such as browsing on the Internet, do not generally demand symmetric data rates and can take advantage of an asymmetric system.

ADSL converts existing twisted-pair copper telephone lines into access paths for multimedia and high-speed data communications. ADSL can transmit more than 6 megabits per sec (Mbps) (optionally up to 8 Mbps) to a downstream subscriber from a central office, and as much as 640 kilobits per second (kbps) (optionally up to 1 Mbps) upstream from a subscriber to the central office. Such rates expand existing access modem capacities by a factor of 50, or more, without new cabling.

ADSL was designed for residential or small-office, home-office type services and thus, it was designed from the outset to operate with the analog voice signals of Plain Old Telephone Service (POTS) simultaneously on the same line, such that an additional copper line is not needed. Generally, the POTS channel is split off from the digital modem by filters to provide uninterrupted POTS, even if the ADSL circuit fails.

Unlike previous copper line technologies, an ADSL system does not need manual pre-adjustment to accommodate line conditions. Instead, the ADSL modem automatically analyzes the line, as part of the process of establishing a connection, and adapts itself to start up the connection. This adaptation process can continue, once the connection is started, as the modem compensates for ongoing changes, such as those due to temperature or other environmental factors. Factors that can affect ADSL transmission include the gauge thickness of the copper cable, the distance between the central office and the subscriber and the amount of interference present on the line.

To support bi-directional channels, ADSL modems can allocate the available bandwidth by FDM, where non-overlapping bands are assigned for the downstream and upstream data. DMT, which has now been accepted by ANSI as the standard line code for ADSL transmission, divides an input data stream among several sub-channels, each sub-channel having the same amount of bandwidth but at different center frequencies. Sub-channels can have different bit rates, as discussed below. Using many sub-channels with very narrow bandwidths means the theoretical channel capacity, as calculated according to Shannon's law, can be approached. Generally, DMT was chosen because it is particularly well suited for transmission over copper line at the operating frequency bands. DMT also copes well with the typical noise and impulses that exist in the residential (subscriber) twisted-wire pair environment.

The sub-channels into which a channel is divided, commonly referred to as tones, are quadrature amplitude modulation (QAM) modulated on a separate carrier, commonly called a subcarrier, and the subcarrier frequencies are multiples of one basic frequency. The ANSI standard ADSL system has a theoretical maximum of 256 frequency sub-channels for the downstream data and 32 sub-channels for the upstream, though, in reality, line conditions, interference and other considerations reduce the actual available number of sub-channels. The frequency difference between two successive sub-channels is 4.3125 Khz. In a DSL-Lite or G.Lite system, the number of downstream data streams is halved, eliminating those at the higher frequencies.

As mentioned above, data to be transmitted is QAM modulated so that each sub-channel can transmit multiple bits and bit rates can vary between sub-channels. As the subscriber loops between the central office and a subscriber generally exhibit variations in gain and phase with frequency, each sub-channel can be arranged to carry a different number of bits appropriate for its frequency on the particular subscriber line. By assigning different numbers of bits to different sub-channels, each sub-channel can operate at an optimal, or near optimal, bit rate for the bandwidth available in the subscriber loop. Sub-channels at frequencies where the signal-to-noise ratio is low can have lower numbers of bits assigned to them, while sub-channels at frequencies with higher signal-to-noise ratios can have higher numbers of bits assigned to them, to keep the probability of a bit error constant across the subcarriers.

Generally, the actual user data traffic over a communication link established between two DMT modems is non-constant. The necessary bandwidth, data rate and event frequency can all vary. A data event is a single Protocol Data Unit (PDU) or a cluster of PDUs. In ATM, a PDU is a fixed length cell; in Internet Protocol, a PDU is a variable length IP packet A particular data event can be characterized as isochronous or asynchronous, and both data events can occur simultaneously over different channels, or groups of channels. A regular, or isochronous, data event, such as voice or compressed interactive video information, typically requires a relatively low bandwidth, but is not tolerant of delay greater than approximately 300 msec. "Bursty", or asynchronous, data events, which are characteristic of interactive human-machine sessions such as world wide web sessions, can occur at random intervals, and can range from a low bandwidth and data rate requirement, such as a keystroke, to a high bandwidth and data rate requirement, such as a JPEG image transfer. In addition, very high bandwidth asynchronous data events, such as large file transfers and network backups, occur infrequently but require significant network resources, both in terms of data rate and bandwidth.

In the interest of conserving power and reducing system cooling requirements at the central office end, it is desirable to operate a DMT modem at a lower power when the data bandwidth is being underutilized. A number of power management states are defined in the current splitterless DMT ADSL (a.k.a. G.Lite or G.992.2) draft recommendation. In a "full on" state (L0), the link is fully functional and the linked subscriber and central office modems are capable of delivering the maximum downstream and upstream rates possible under the given loop conditions, given the presence of any simultaneous active POTS devices and service provider restrictions. In the "idle" state (L3), the communication link is not active, and requires no power. Both the receiving and central office modems are transmitting idle (zero) signals. An optional "low power" state (L1), is also defined, in which the communication link would be operational, but only require enough power to maintain the embedded operations control (EOC) channel and a low-rate data stream. State changes between full on, idle and low power management states are initiated under control of a higher layer function, typically at the application layer, and take on the order of hundreds of milliseconds to complete. As a result, these power management state changes are relatively infrequent when compared to the rate of change of actual user data traffic demands. In addition, since control of the power management state is dictated by higher layer functions it is not certain that the periods of low user data traffic can be exploited by the modem physical layer functions to save power.

For these reasons, an alternate power saving mode has been proposed for the next version of the DMT ADSL standard (G.992.2bis). This 'quiescent mode' would offer similar power savings as the L1 and L3 power management states but would address the issues of rapid mode transitions and control at the modem physical layer. While entry into quiescent mode would require negotiation between the ATU-C and ATU-R (the CO and remote terminating units) taking on the order of 80 msec, a return to the high data rate L0 state (or potentially L1 (if that was the initial state)) would take only 1–2 DMT symbol periods (0.25–0.5 msec)). This would allow entry into and out of quiescent mode transparently of the higher layers (not impacting data throughput or delay). While in quiescent mode, there would be either no user data bandwidth on the link or a reduced user data bandwidth (transmitting in some (1 out of N) sub-set of symbol periods. There would be some overhead signal transmission to maintain link timing (e.g. pilot tone) and to monitor for channel variations.

The quiescent mode would be capable of exploiting gaps between user data traffic events where those gaps significantly exceed the time required to negotiate an entry into quiescent mode. Where the user data traffic is primarily due to isochronous data sources, such as interactive voice and/or video, the frame rate (e.g. typically 5–30 msec for voice) of the sources is such that there is not enough time between data events to negotiate entry into quiescent mode and as a result the modem must remain in the higher power L0 (or L1) state, even though the average user data rate may be much less than the modem link data rate. Buffering of the isochronous traffic into larger blocks of data with more time between blocks is not an acceptable option either, as this would require large buffers and, more importantly, would introduce significant delays (latencies) in the data connection which may not be tolerated in interactive voice communication.

The inability to exploit quiescent mode when the link is carrying only isochronous data traffic is a significant shortcoming for the likely cases where a user may have an interactive voice (e.g. voice-over-IP or voice-over-ATM) session running in parallel with a web-browsing session. Most of the time, there is only the regular, but relatively low-rate voice data traffic on the link—only occasionally injected with a short, high throughput event such as a graphics-heavy web page download.

It is therefore desirable to provide a method and apparatus that permits a modem to operate in a reduced power mode when isochronous data is being transmitted over a communication link, and to detect and adjust quickly to new traffic conditions without recourse to higher application levels.

SUMMARY OF THE INVENTION

In a first aspect, the present invention provides a method for power management in a modem attached to a communications link. The modem, typically a discrete multi-tone modem, has a full on power mode and a quiescent power mode. The method consists of monitoring a communications link for incoming data traffic. If data traffic is detected on the link, it is tested to determine its periodicity, Typically, data arriving over a link is either asynchronous data or isochroous (quasi-periodic) data. The power mode of the modem is then determined based on the determined periodicity of the incoming data traffic.

The periodicity of the incoming data traffic can be determined either by performing a windowed autocorrelation, or a short-time Fourier transform on the incoming data traffic. Where a Fourier transform is used, the method can also include picking a peak and estimating a harmonic frequency of the incoming data traffic.

In a preferred embodiment, if the incoming data traffic is determined to be quasi-periodic, then the selected power mode is a quiescent power mode. Likewise, if the incoming data traffic is determined to be asynchronous, then the selected power mode is a full on power mode. Where the quiescent power mode is selected, the method can also include a further step of determining a minimum data rate at which to operate the modem.

To implement the method of the present invention, there is also provided a data traffic predictor and a dicrete multi-tone modem incorporating the traffic predictor. The traffic predictor comprises a data traffic monitor that detects incoming data traffic at the modem, a periodicity detector that determines if the incoming data is quasi-periodic, and a power mode controller for determining an appropriate power mode for the modem based on the determined periodicity of the incoming data traffic.

In accordance with an aspect of the present invention, there is provided a method for power management in a modem attached to a communications link. The modem includes a full on power mode and a quiescent power mode. The method includes the steps of: monitoring the communications link for incoming data traffic; analyzing a time series of the incoming data traffic and determining its periodicity; and selecting one of the power modes of the modem based on the determined periodicity of the incoming data traffic.

In accordance with a further aspect of the present invention, there is provided a data traffic predictor for a modem, for estimating data traffic over a communications link to permit power management in the modem. The modem includes a full on power mode and a quiescent power mode. The data traffic predictor includes; a data traffic monitor for detecting incoming data traffic at the modem and having means for determining a data arrival rate of the incoming data traffic; a periodicity detector for processing the data arrival rate and determining its periodicity; and a power mode controller for determining one of the power modes for operation of the modem based on the determined periodicity of the incoming data traffic.

In accordance with a further aspect of the present invention, there is provided a discrete multi-tone modem.

The modem includes: a digital subscriber line transceiver having a full on power mode and a quiescent power mode; and a traffic data traffic predictor having a data traffic monitor for detecting incoming data traffic and having means for determining a data arrival rate of the incoming data traffic, a periodicity detector for processing the data arrival rate and determining its periodicity, and a power mode controller for determining one of the power modes for operation of the transceiver based on the determined periodicity of the incoming data traffic.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
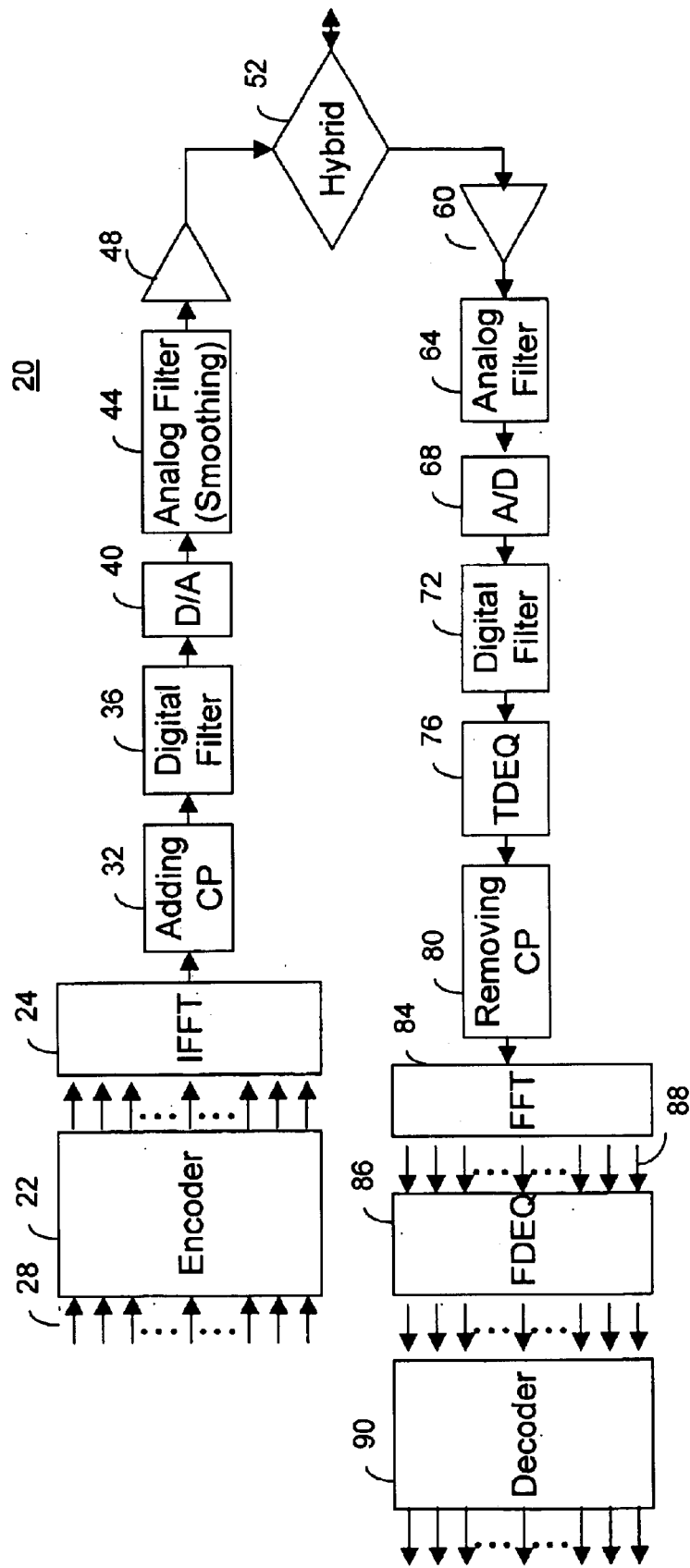
FIG. 1 is a block diagram of a prior art DMT modem.

Before discussing the present invention in detail, a prior art DMT modem will be discussed with reference to FIG. 1. In FIG. 1, a prior art DMT modem is indicated generally, in block diagram form, at 20. The transmit side of modem 20 commences with a constellation encoder, at block 22, and a block 24 to perform an Inverse Fast Fourier Transform (IFFT) to convert input data into a digital time domain signal representing modulated subcarriers. Each of the N subcarriers transmits a bit stream 28, although bit streams 28 can be different lengths for different subcarriers. Each subcarrier is then duplicated with its conjugate counterpart, to generate an IFFT output that is real only, holding 2N time domain samples.

The time domain signal output from the IFFT is next processed at block 32 to add a cyclic prefix (CP). The CP separates the symbols in time in order to decrease intersymbol interference (ISI). As is well known, the signal going through the communication channel is linearly convolved with the impulse response of the channel. If the impulse response is shorter than the duration of the CP, each symbol can be processed separately, and ISI can be avoided. Also, the receiver views the incoming signal as if it has gone through a cyclic convolution. This ensures orthogonality between carriers.

The signal is then processed, at block 36, by digital filtering to suppress the side lobes of the signal and to ensure that the signal is within the spectral mask defined by relevant standards, etc. A digital to analog conversion is then performed at block 40 and, at block 44, the signal is filtered (smoothed) by an analog filter to further attenuate out-of-band signal components, including those resulting from the digital to analog conversion. Finally, the signal is boosted by a line driver 48 and is passed to a hybrid 52 for transmission through loop 56. As is well known, hybrid 52 separates the transmit side of modem 20 from the receive side.

The receive side of modem 20 includes an automatic gain control, in block 60, to boost signals received at hybrid 52 to defined levels. At block 64, an analog filter is employed to clean the received signal and, at block 68 an analog to digital conversion is performed. At block 72, digital filters filter the signal. To further shade the received side, block 76 comprises a time domain equalizer (TDEQ) which is employed to shorten the response of the communication channel. Generally, the TDEQ is a linear digital filter designed to condition the signal to minimize the ISI and interchannel interference (ICI) This is accomplished by shrinking the total impulse response of the channel to the length of CP+1, such that one symbol does not interfere with the next one.

The equalized signal is then processed, at block 80, to remove the CP, which was inserted at the transmitter, and the signal is passed to block 84 where a Fast Fourier Transform (FFT), complementary to the IFFT, is performed. The signal is then passed to a frequency domain equalizer (FDEQ), at block 86, to recover the transmitted QAM symbols from which the bit streams 88 which are recovered, buffered and reassembled into the transmitted information by the constellation decoder at block 90. DMT modems can also include a POTS splitter (not shown), which enables simultaneous access to standard telephony.

Data is typically transferred over a DMT modem link as asynchronous transfer mode (ATM) cells. The ATM cell streams can be isochronous or asynchronous data transfers. Since ATM uses fixed length cells, the user traffic characteristics are determined by the cell arrival rate or inter-cell arrival interval alone. Future, or proprietary versions, of DMT modems could also support data transfer using Internet Protocal (IP) packets directly. The characteristics of the data traffic in that case remain similar to the ATM case with the exception that the protocol data units or packets, in the IP case, are not a fixed length, and the packet size and packet arrival rate together determine the data characteristics. In either case, it is possible to generate a profile of data traffic entering a DMT modem transmitter, prior to insertion of ATM IDLE cells or other equivalent rate adaptation mechanisms, by measuring the user data input to the transmitter over a given period.

Figure 2:
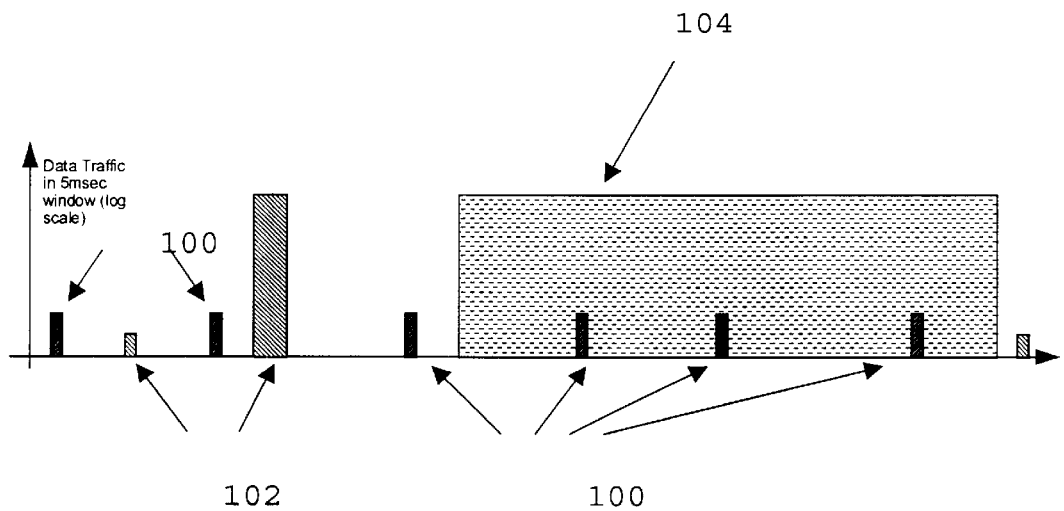
FIG. 2 is a graphical representation of an example data traffic profile as a function of time.

FIG. 2 shows, schematically, an example profile of data traffic received at a modem 20 in a given period. A series of substantially regular, isochronous data events 100, such as packetized voice or video data, arrive with a substantially steady average cell arrival rate. Generally, isochronous data events 100 can be considered as periodic or quasi-periodic, events, with an associated data rate that is typically much lower than the raw user rate possible on a DSL modem link. In an ideal communications system, isochronous data events would occur with a regular periodicity, in reality, there is always some "jitter" or random delay variation associated with each event, due to source or network conditions. Small bursty data events 102, such as keypad strokes or a web page transfer, occur randomly with short bursts of cells. Also shown is a large asynchronous data event 104, such as a large file transfer, or a network backup. Such a large data event 104 is an infrequent occurrence, but it typically has a relatively high data rate. As used herein, a data event refers to the continuous transmission of one or more PDUs.

To better exploit periods of low data traffic a new intermediate "quiescent" power mode has recently been proposed. Entry and exit from this low-power quiescent mode is controlled at the physical layer at the modem, as opposed to a higher application layer, and is comparatively quick to respond in relation to previously described power modes. In particular, transition into quiescent mode from full on can occur within ~80 milliseconds, and transition from quiescent mode back to the full on data-carrying state can occur in 1–2 symbol intervals (~250–500 microseconds). The shorter transition from quiescent mode to full on is proposed in order to avoid cell/packet loss or delay when user traffic suddenly increases. In the proposed quiescent mode, it becomes possible to exploit more rapid changes in data traffic demands without incurring data transfer latencies or delays. Further, while in quiescent mode, limited data transfer can still be supported. To fully exploit a quiescent power management mode, it is desirable to monitor the data traffic to determine when the modem can change to quiescent mode and what data throughput needs to be maintained in quiescent mode. Preferably such monitoring, detection and adaptation would be transparent to the higher layer functions in the telecommunications network.

While the proposed quiescent mode does permit more rapid changes to and from a low power state, the approximately 80 milliseconds required to negotiate and accomplish a move to quiescent mode is still too slow to detect and react to isochronous inter-PDU intervals as short as 10–30, and to move back to full on mode when an asynchronous event is detected without requiring large buffers. The present invention provides a method and apparatus that quickly detects traffic changes and allows timely moves from quiescent to full on mode, and vice versa. This permits quiescent mode to be used for transmitting isochronous data, while enabling early detection of asynchronous events and a subsequent fast return to the normal (L0 or L1) mode.

Figure 3:
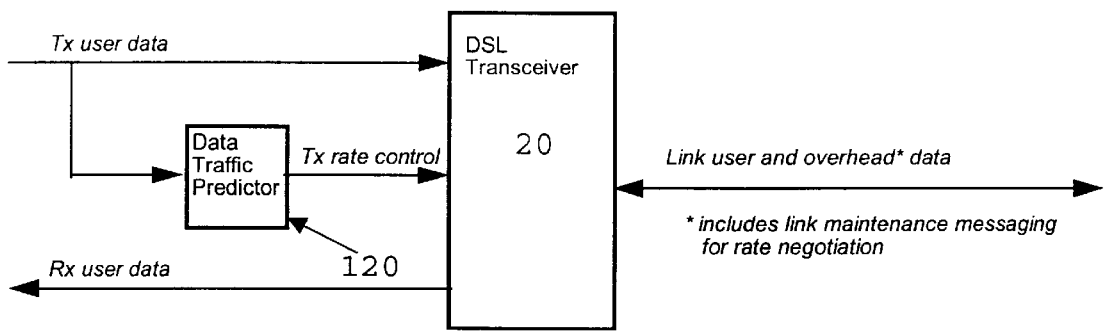
FIG. 3 is block diagram of a DMT modem and data traffic predictor in accordance with an embodiment of the present invention.

Referring to FIG. 3, a block diagram of a DMT modem 20 with a data traffic predictor 120 in accordance with the present invention is shown. As is known to those of skill in the art, in ATM data transport, ATM "IDLE" cells are used for rate adaptation to the physical link data rate (i.e. to "fill the pipe" when there is no data to transmit). Data traffic predictor 120 operates before this IDLE cell insertion, or is configured to filter out the IDLE cells when calculating the actual user cell, or data, rate.

Figure 4:
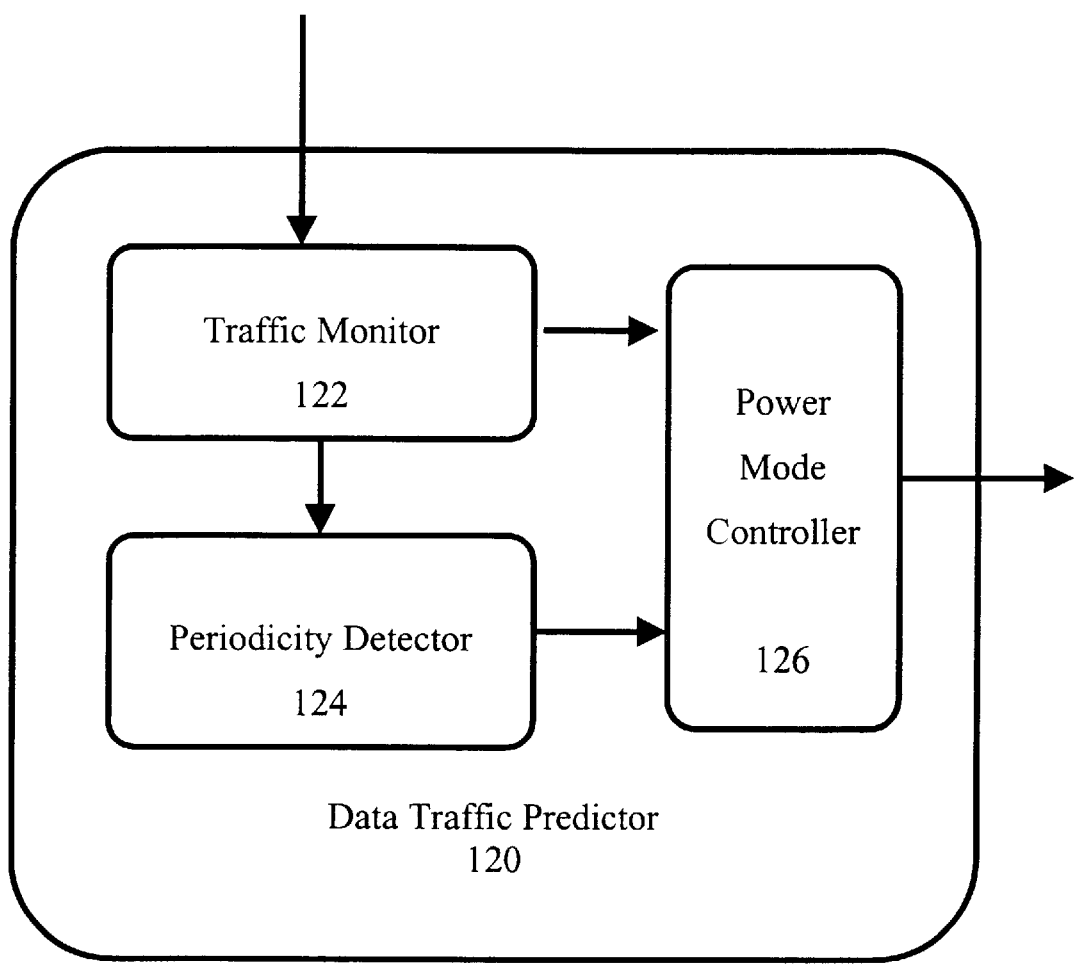
FIG. 4 is a block diagram of the data traffic predictor of FIG. 3.
Figure 5:
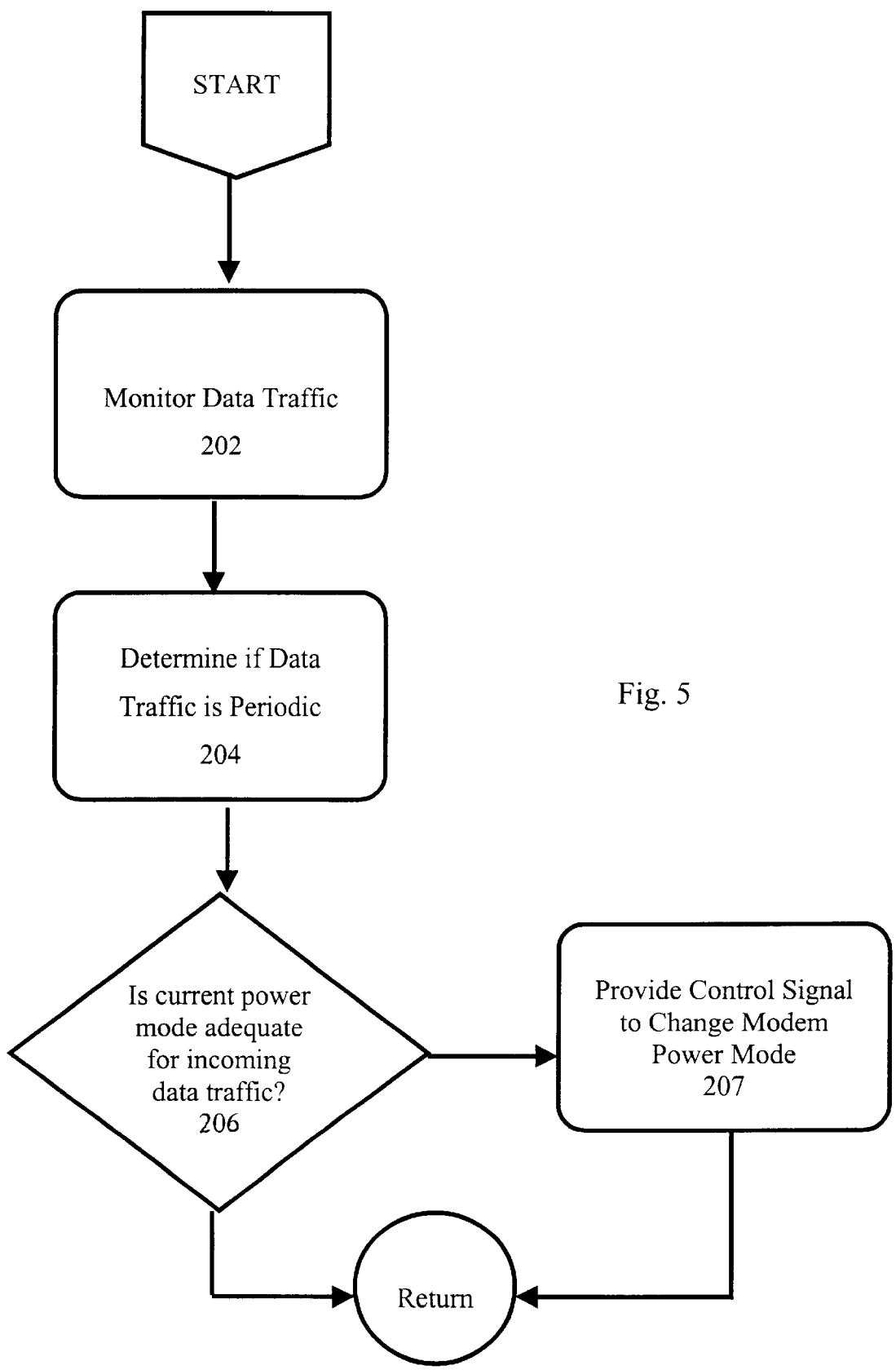
FIG. 5 is a flow chart of a method for power management in a modem.

Referring to FIG. 4, data traffic predictor 120 generally comprises a data traffic monitor 122, a periodicity detector 124 and a power mode controller 126. In operation, as shown in the method of FIG. 5, data traffic monitor 122 monitors data arriving at modem 20 to determine a data arrival rate, as shown in step 202. At step 204, periodicity detector 124 then processes the data arrival rate information to determine if the arriving data is periodic, or quasi-periodic. If power mode controller 126 determines, at step 207, that the current power mode is adequate to support the current data traffic, then no change is made to the modem power mode. Otherwise, at step 208, power mode controller 126 outputs a control signal to modem 20 requesting the link power-mode it has determined is appropriate.

In a presently preferred embodiment, the data arrival rate is determined at step 202 by having traffic monitor 122 monitor PDUs as they arrive, and associate an arrival time T with each packet. If the PDUs are variable length packets, such as IP packets, a packet size K is also associated with each PDU. The arrival times can then be processed to determine an average data arrival rate over a predetermined time interval. Optionally, the transmitting modem can provide feedback concerning an output buffer length, from which predictor 120 can determine the average expected data arrival rate.

To determine, at step 204, if the incoming data is periodic, a time series, x, is used to model the data traffic where $x(n)$ is the amount of data arriving at the modem in a time interval $\{(n-1)T_s, n\, T_s\}$. Interval $T_s$ is selected to provide sufficient measurement resolution to discern traffic patterns in interactive coded speech and video transmission ($T_s \sim O(1\text{ msec})$). The data traffic time series can then be analyzed using classic sliding window analysis techniques, such as short-time Fourier transform and/or short-time windowed autocorrelation, as is used in speech waveform analysis, to determine the presence of periodic or quasi-periodic components in the data traffic, which are representative of isochronous traffic. If the traffic pattern is sufficiently periodic, or quasi-periodic, then one can estimate the amount of data traffic expected over an interval equal to the estimated period of that pattern. Since there will be some aperiodicity due to cell or packet arrival rate jitter, it is necessary to budget for variations in the amount of data traffic seen in any single estimated period. If a significant change above this budgeted amount is detected, however, controller 126 signals the need to transition back to full on mode to support the higher data rate. It should be noted that networks offering Quality of Service (QoS) guarantees can be expected to deliver isochronous PDUs with less jitter and end-to-end delay than non-QoS networks, such as existing IP networks. It is, therefore, generally possible to use a higher threshold for determining periodicity in QoS networks.

The short time windowed autocorrelation method for estimating period and periodicity is common in speech analysis coding applications, and is the presently preferred method for detecting periodicity in data traffic predictor 120. Let $x(n,k)$ be a windowed sequence of $x(n)$, from $n=kL$ to $n=(k+1)L-1$, computed at intervals $LT_s$, given by:

$$xw(n, k) = \begin{cases} x(n+kL) & \text{for } n = 0, 1, \ldots, L-1 \\ 0 & \text{otherwise} \end{cases}$$

L is selected sufficiently large to capture multiple (3–5) periods of the longest anticipated period of an isochronous interaction data stream (e.g. ~100 msec for video frame rates on the order of tens of seconds). The windowed autocorrelation function is given by:

$$\Phi(j, k) = \sum_{n=0}^{L-1} (x(n, k) - x_{ave}(k)) \times (x(n+j, k) - x_{ave}(k))$$

where $$x_{ave}(k) = \frac{1}{L} \sum_{n=0}^{L-1} x(n, k)$$

Periodicity is checked by locating the peak(s) in Φ(j,k) for $$\frac{P_{min}}{T_s} \le j \le \frac{P_{max}}{T_s}$$

where $P_{min}$ and $P_{min}$ are, respectively, the minimum and maximum anticipated period in isochronous traffic, and comparing those to a threshold given by:

$$thres(j) = \left(1 - \frac{j}{L}\right) \times \Phi(0) \times K_{thres}$$

Where there are peaks exceeding this threshold, the data traffic pattern can be considered periodic or quasi-periodic. $K_{thres}$ is chosen to be a value less than one, generally in the range of 0.4 to 0.9, with the higher values possible with networks delivering PDUs with less jitter, or delay variation. The estimated period, $P_{est}$(k), can then be determined from the index to the largest peak meeting this threshold. The period estimates may be further smoothed (de-glitched), if desired, by a non-linear smoothing (e.g. median) filter to reduce the impact of an occasional erroneous estimate.

To increase the robustness of this windowed autocorrelation algorithm to jitter in the inter-PDU arrival interval, x(n) can first be filtered through a simple first-order recursive filter with a time constant on the order of 10 msec, to spread the 'energy' of short impulses in x(n).

When the traffic pattern is determined to be sufficiently periodic to indicate an isochronous data stream, a transition to quiescent mode at a reduced link rate is negotiated and implemented. The reduced link rate is chosen to be able to support the current average user data arrival rate with link overhead and some additional margin to accommodate measurement tolerances and small asynchronous data events, without triggering a transition back to full on mode. When in the reduced link rate quiescent mode, the traffic pattern is continuously monitored to determine whether the pattern changes and whether a change in mode, or renegotiation of the reduced link rate, is required.

The amount of data expected in the next period, of duration Pest, can then be computed as:

$$\frac{P_{est}}{MT_s} \sum_{l=0}^{M} x_{ave}(k-1)$$

where $MT_s$ is an averaging period on the order of one second. If the actual data arriving in this period exceeds some multiple of this value, which multiple can be determined by modeling or other means, then the algorithm immediately forces a transition back to the full on state. Using a threshold higher than the average arrival rate in a period permits for some jitter in the isochronous traffic without triggering unnecessary transitions back to the full on state. The threshold is set low enough, however, to detect a significant increase in data due to some asynchronous event early enough to avoid large buffers to queue the incoming data while awaiting a transition back to the normal (L0 or L1) mode.

Figure 6:
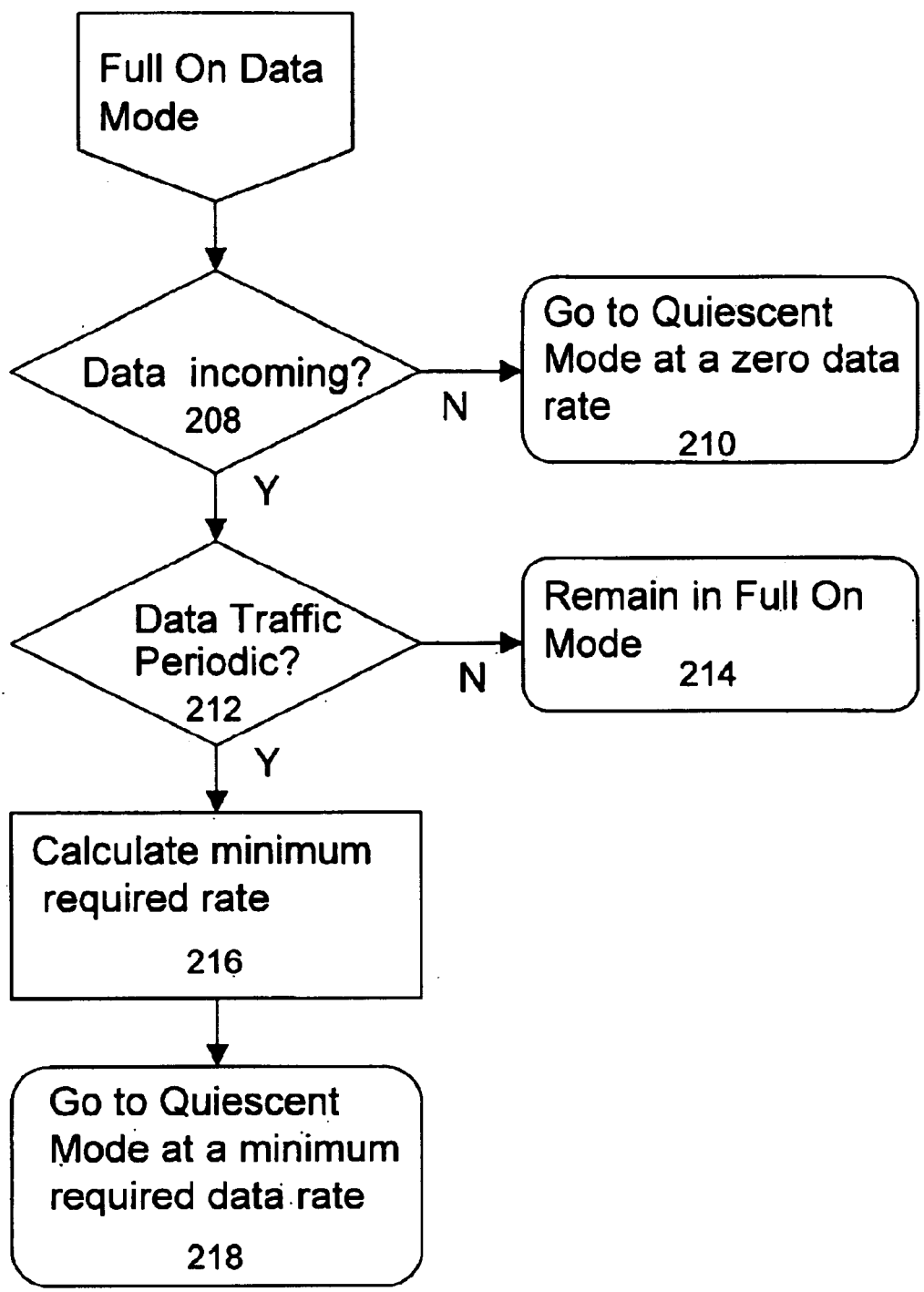
FIG. 6 is a flow chart of a portion of the method shown in FIG. 5 wherein the modem is initially in a full on power mode.
Figure 7:
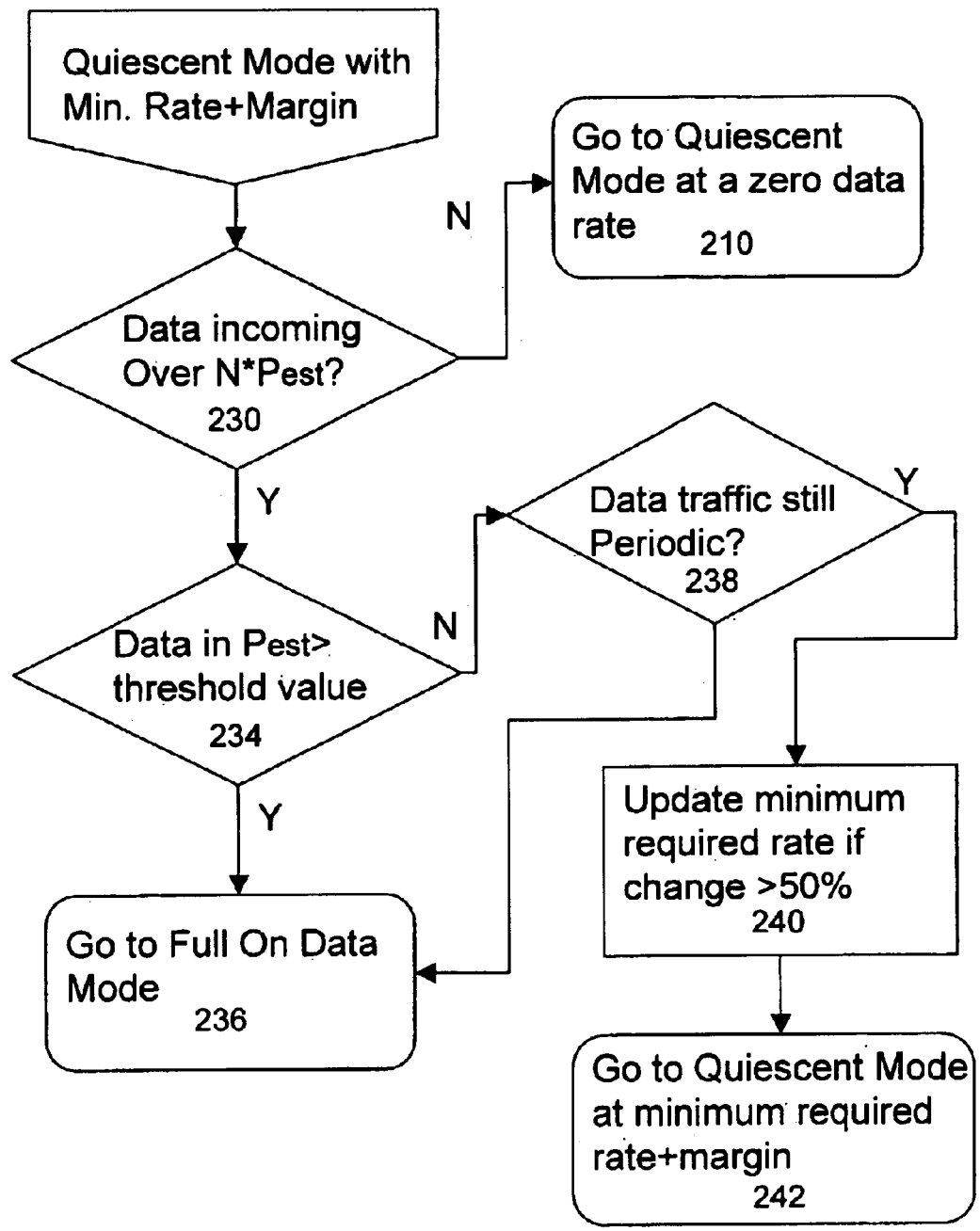
FIG. 7 is a flow chart of a portion of the method shown in FIG. 5 wherein the modem is initially in a quiescent power mode running at a minimum required data rate, plus a margin.
Figure 8:
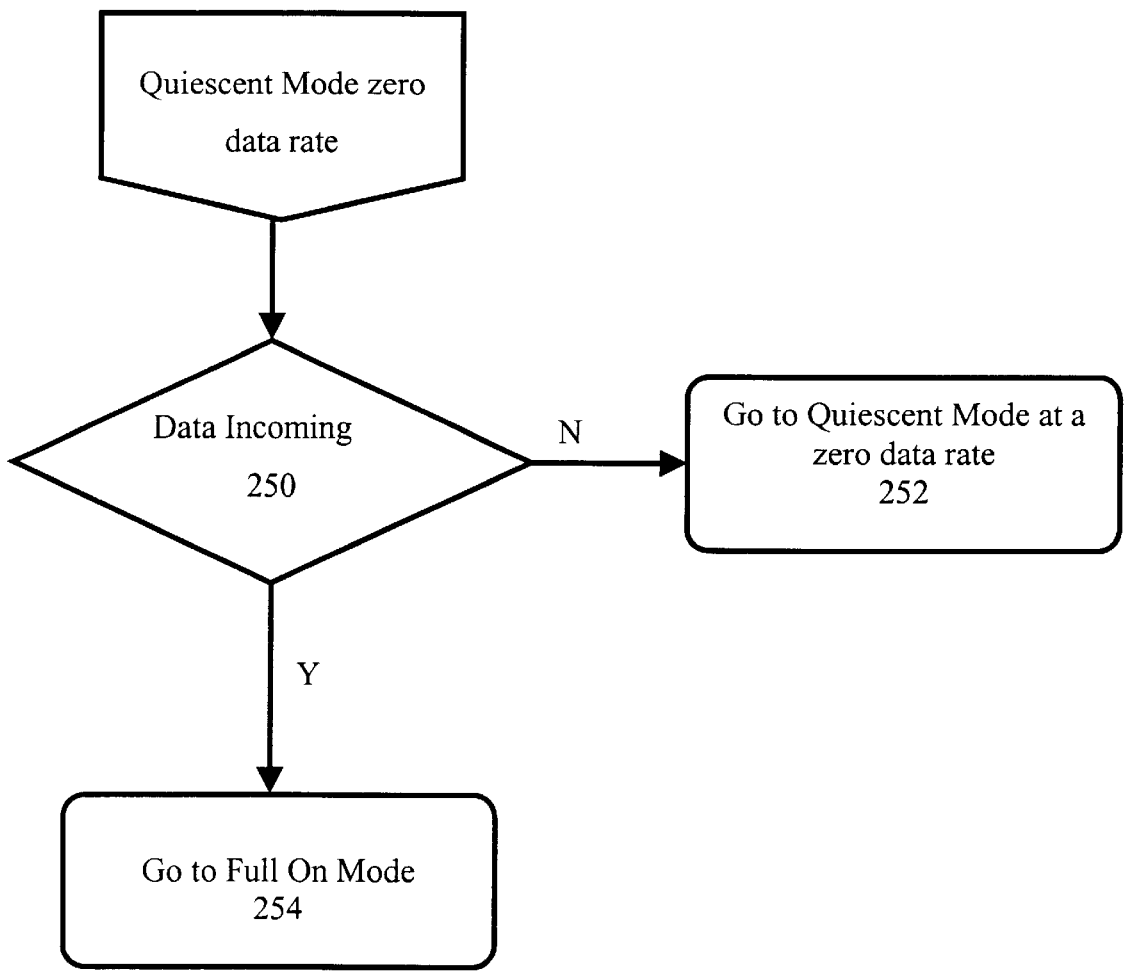
FIG. 8 is a flow chart of a portion of the method shown in FIG. 5 wherein the modem is initially in a quiescent power mode running at a zero data rate.

The operation of data traffic predictor 120 can be better understood by referring to FIGS. 6–8, which detail its operation from various initial power modes: full on, quiescent operating at a minimum data rate plus safety margin, and quiescent operating at a zero data rate, respectively. In FIG. 6, modem 20 is initially operating in the full on mode. At step 208, data traffic monitor 122 determines if any data is being transmitted on the link. If no data is being transmitted in a given period, predictor 120 moves to step 210 and power mode controller 126 signals to modem 20 to enter the quiescent mode at a zero data rate, which is essentially an idle state with only sufficient overhead signals, etc. being transmitted to maintain the link in a data-ready state. If incoming data is detected, operation of predictor 120 moves to step 212 where periodicity detector 124 is called upon to determine if the incoming data pattern is periodic, as described above. If the incoming data pattern is not determined to be periodic, modem 20 continues to operate in full on mode, as shown in step 214. If, however, the incoming data pattern is determined to be periodic, i.e. the incoming data is isochronous, power mode controller 126 calculates the minimum required data throughput, based on the data arrival rate, necessary to receive the isochronous data, as shown at step 216, and signals to modem 20 to enter the quiescent mode at this minimum required rate, plus an additional predetermined safety margin to cover jitter in the isochronous data. It may be noted that the modem may initially attempt to enter quiescent mode (no data) between the first few isochronous events but fail as the next data event occurs before a transition to quiescent mode can be negotiated.

The flow chart of FIG. 7 shows the operation of predictor 120 where modem 20 is initially receiving isochronous data in the quiescent mode, at a predetermined minimum data rate, plus a margin. At step 230, traffic monitor 122 monitors the link over a period N*$P_{est}$, to determine if any data is incoming. N is a number greater than one chosen empirically or otherwise to handle jitter and other line conditions. If no incoming data is detected, power controller 126 signals to modem 20 to enter quiescent mode at a zero data rate, as shown in step 232. If incoming data is detected at step 230, power mode controller 126 determines, at step 234, whether the incoming data received in the last interval of length $P_{est}$ is greater than some threshold value, indicating that a large asynchronous data event is likely occurring. If this is the case, power controller 126 signals to modem 20 to enter the full on mode, as shown in step 236. If the amount of incoming data is less than this threshold value, periodicity detector 124 determines, at step 238, if the incoming data is periodic, as described above. If the incoming data is no longer periodic, power controller 126 signals to modem 20 to enter the full on mode. Whereas, for periodic data, power controller 126 checks the data arrival rate at step 240, determines if it has increased by some predetermined amount, here shown as 50%, and increases, at step 242, the minimum required data rate of modem 20 if it determines that the incoming data rate has changed sufficiently.

FIG. 8 shows the operation of predictor 120 where modem 20 is initially operating in the quiescent mode at a zero data rate. Traffic monitor 122 periodically tests for incoming data, as shown at step 250. If no incoming data is detected, modem 20 remains in quiescent mode at a zero data rate, as shown in step 252. If incoming data is detected at step 250, power controller 126 signals to modem 20 to enter full on mode, as shown in step 254. In future periods, predictor 120 can test the incoming data to determine if it is periodic and, therefore, isochronous, and reduce the power mode to quiescent mode operating at a minimum data rate, if necessary.

The data traffic predictor and method of the present invention permit a constant monitoring of data traffic across a link, and change to reduced power modes. The monitoring and adaptation to different power modes is achieved at the physical layer rather than at higher application layers, which means that the modem can be very quick to adapt to changes in the data traffic, particularly from the quiescent mode to full on mode. This permits quiescent mode to be employed for the reception of isochronous data, and can result in significant power savings in the modems in a central office.

The above-described embodiments of the invention are intended to be examples of the present invention and alterations and modifications may be effected thereto, by those of skill in the art, without departing from the scope of the invention which is defined solely by the claims appended hereto.

We claim:

1. A method for power management in a modem attached to a communications link, the modem having a full on power mode and a quiescent power mode, comprising the steps of:

monitoring the communications link for incoming data traffic;

analyzing a time series of the incoming data traffic and determining its periodicity; and selecting one of the power modes of the modem based on the determined periodicity of the incoming data traffic.

2. A method according to claim 1, wherein the selecting step selects the quiescent power mode, when the determining step determines that the incoming data traffic is quasi-periodic.

3. A method according to claim 2, including a further step of determining a minimum data rate at which to operate the modem in the quiescent power mode.

4. A method according to claim 1, wherein the selecting step selects the full on power mode, when the determining step determines that the incoming data traffic is asynchronous.

5. A method according to claim 1, wherein the step of analyzing includes the step of performing a windowed autocorrelation of the incoming data traffic.

6. A method according to claim 1, wherein the step of analyzing includes the step of performing a short-time Fourier transform of the incoming data traffic.

7. A method according to claim 1, wherein the step of determining further includes locating peaks in the incoming data traffic and estimating a period of the incoming data traffic.

8. A method according to claim 1, wherein the modem is a discrete multi-tone modem.

9. A data traffic predictor for a modem, for estimating data traffic over a communications link to permit power management in the modem, the modem having a full on power mode and a quiescent power mode, comprising:

a data traffic monitor for detecting incoming data traffic at the modem and having means for determining a data arrival rate of the incoming data traffic;

a periodicity detector for processing the data arrival rate and determining its periodicity; and a power mode controller for determining one of the power modes for operation of the modem based on the determined periodicity of the incoming data traffic.

10. A data traffic predictor according to claim 9, wherein the periodicity detector performs a windowed autocorrelation of the incoming data traffic.

11. A data traffic predictor according to claim 9, wherein the periodicity detector performs a short-term Fourier transform of the incoming data traffic.

12. A data traffic predictor according to claim 9, wherein the periodicity detector locates peaks in the incoming data traffic and estimates a period of the incoming data traffic.

13. A data traffic predictor according to claim 9, wherein the power mode controller provides a signal to the modem to change to the determined power mode.

14. A discrete multi-tone modem; comprising:

a digital subscriber line transceiver having a full on power mode and a quiescent power mode; and a traffic data traffic predictor having a data traffic monitor for detecting incoming data traffic and having means for determining a data arrival rate of the incoming data traffic, a periodicity detector for processing the data arrival rate and determining its periodicity, and a power mode controller for determining one of the power modes for operation of the transceiver based an the determined periodicity of the incoming data traffic.

15. A discrete multi-tone modem according to claim 14, wherein the periodicity detector performs a windowed autocorrelation of the incoming data traffic.

16. A discrete multi-tone modem according to claim 14, wherein the periodicity detector performs a short-term Fourier transform of the incoming data traffic.

17. A discrete multi-tone modem according to claim 16, wherein the periodicity detector locates peaks in the incoming data traffic and estimates a period of the incoming data traffic.

18. A discrete multi-tone modem according to claim 14, wherein the power mode controller provides a signal to the transceiver to change to the determined power mode.

* * * * *